United States Patent
Lin et al.

(10) Patent No.: US 9,377,568 B2
(45) Date of Patent: Jun. 28, 2016

(54) COLOR FILTER AND DISPLAY (71) Applicant: E Ink Holdings Inc., Hsinchu (TW)

(72) Inventors: Yi-Ping Lin, Hsinchu (TW); Po-Chun Chuang, Hsinchu (TW); Pei-Lin Huang, Hsinchu (TW); Chun-Wei Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 281 days.

(21) Appl. No.: 14/101,361

(22) Filed: Dec. 10, 2013

(65) Prior Publication Data
US 2014/0254038 A1    Sep. 11, 2014

(30) Foreign Application Priority Data
Mar. 8, 2013    (TW) .............. 102108296 A (51) Int. Cl.
G02B 5/22    (2006.01)
G02B 7/00    (2006.01)
G02B 5/20    (2006.01)
G02F 1/1335    (2006.01)

(52) U.S. Cl.
CPC .......... G02B 5/201 (2013.01); G02F 1/133514 (2013.01)

(58) Field of Classification Search
CPC .......... G02B 5/201; G02B 5/22; G02B 5/285; G02B 5/223; G02B 5/20; G02B 5/286; G02F 1/133514; G02F 1/133512; G02F 2201/52; G02F 1/134309; G02F 2001/133368; H01L 27/14621

USPC ......... 359/885, 890, 891, 892, 580, 588, 589, 359/590
See application file for complete search history.

(56) References Cited

U.S. PATENT DOCUMENTS

| RE36,161 E | 3/1999 | Okubo et al. |
| 6,969,948 B2 | 11/2005 | Urabe et al. |
| 7,466,380 B2 | 12/2008 | Tsuchiya et al. |
| 2009/0167996 A1* | 7/2009 | Takahashi ......... G02F 1/133514 349/106 |

FOREIGN PATENT DOCUMENTS

| CN | 101470295 | 7/2009 |
| JP | 2001281441 | 10/2001 |
| KR | 20070071633 | 7/2007 |

OTHER PUBLICATIONS

"Office Action of China Counterpart Application", issued on Dec. 21, 2015, p. 1-p. 7, in which the listed references were cited.

* cited by examiner

Primary Examiner — Jade R Chwasz
(74) Attorney, Agent, or Firm — Jianq Chyun IP Office (57) ABSTRACT

A color filter includes a substrate, a first color filter pattern and a second color filter pattern. The substrate has at least one first pixel region and at least one second pixel region adjacent to the first pixel region. The first color filter pattern is disposed on the substrate and includes a first central pattern and first protruding patterns connected to the first central pattern and protruding outwardly from the first central pattern so that a portion of the first protruding patterns are located in the second pixel region. The second color filter pattern includes a second central pattern located within the second pixel region.

16 Claims, 5 Drawing Sheets

COLOR FILTER AND DISPLAY

CROSS-REFERENCE TO RELATED APPLICATION

This application claims the priority benefit of Taiwan application serial no. 102108296, filed on Mar. 8, 2013. The entirety of the above-mentioned patent application is hereby incorporated by reference herein and made a part of this specification.

BACKGROUND OF THE INVENTION

1. Field of Invention

The present invention relates to an optical film of a display component, and particularly to a color filter of a display.

2. Description of Related Art

A color filter is commonly applied in a flat-panel display for displaying multiple colors. Generally, a color flat-panel display commonly includes an active device array substrate, a color filter and a display medium disposed therebetween. Pixel structures arranged in an array are disposed on the active device array substrate to drive the display medium within the corresponding pixel region(s) and therefore represent the required optical transmittance, and color filter patterns arranged in an array are disposed on the color filter so that the light passing through the corresponding color filter pattern(s) represents a specific color.

To achieve the required display quality of a color display, the color filter and the active device array substrate are required to be assembled with desired alignment accuracy, so as to prevent color shift. For example, in a green pixel, the pixel structure predetermined for displaying a green screen is required to be aligned with the corresponding green color filter pattern. Once a misalignment occurs between the color filter and the active device array substrate, the pixel structure predetermined for displaying a green screen may correspond to another non-green color filter pattern and therefore display an undesired color. Besides, when the image displayed by a flat-panel display is viewed at a large angle, the light predetermined to pass through a green color filter pattern may pass through another non-green color filter pattern due to the large inclined viewing angle, thereby causing a color shift phenomenon. Particularly, such color shift phenomenon is more obvious in a reflective flat-panel display.

SUMMARY OF THE INVENTION

The present invention provides a color filter beneficial to mitigate the color shift phenomenon of a display.

The color filter of the present invention includes a substrate, a first color filter pattern and a second color filter pattern. The substrate has at least one first pixel region and at least one second pixel region adjacent to the first pixel region. The first color filter pattern is disposed on the substrate. The first color filter pattern includes a first central pattern and a plurality of first protruding patterns. The first central pattern is located within the first pixel region, and the first protruding patterns are connected to the first central pattern and protrude outwardly from the first central pattern so that at least a portion of the first protruding patterns are located in the second pixel region. The second color filter pattern is disposed on the substrate. The second color filter pattern includes a second central pattern located within the second pixel region.

According to an embodiment of the present invention, the second color filter pattern further includes a plurality of second protruding patterns. The second protruding patterns are connected to the second central pattern and protrude outwardly from the second central pattern so that at least a portion of the second protruding patterns are located in the first pixel region. The first protruding patterns and the second protruding patterns are arranged alternately. Besides, one of the first protruding patterns is located between two adjacent second protruding patterns, and a width of the one of the first protruding patterns is greater than a distance between the two adjacent second protruding patterns so that the one of the first protruding patterns is partially overlapped with at least one of the two adjacent second protruding patterns. Alternatively, one of the second protruding patterns is located between two adjacent first protruding patterns, and a width of the one of the second protruding patterns is greater than a distance between the two adjacent first protruding patterns so that the one of the second protruding patterns is partially overlapped with at least one of the two adjacent first protruding patterns.

According to an embodiment of the present invention, an area of the first color filter pattern in the first pixel region is greater than ½ of an area of the first pixel region.

According to an embodiment of the present invention, an area of the second color filter pattern in the second pixel region is greater than ½ of an area of the second pixel region.

According to an embodiment of the present invention, the first color filter pattern is partially overlapped with the second color filter pattern.

According to an embodiment of the present invention, the first color filter pattern and the second color filter pattern have a plurality of light-transmitting openings, respectively.

According to an embodiment of the present invention, the first color filter pattern and the second color filter pattern have different colors.

A display of the present invention includes the said color filter, an array substrate and a display medium. The display medium is disposed between the color filter and the array substrate.

According to an embodiment of the present invention, the array substrate has a plurality of pixel structures correspondingly disposed in the first pixel region and the second pixel region.

According to an embodiment of the present invention, the pixel structures are reflective pixel structures.

According to an embodiment of the present invention, the pixel structures are transparent pixel structures.

According to an embodiment of the present invention, the display medium includes a liquid crystal layer, an organic light emitting layer, an electrophoretic display medium layer, an electrowetting display dielectric layer or a combination thereof.

According to an embodiment of the present invention, the array substrate is an active device array substrate.

In view of the above, in the color filter of each embodiment of the invention, at least one the color filter pattern has a plurality of protruding patterns protruding from one pixel region into the adjacent pixel region. In such manner, when the color filter of the invention is applied to a display, this design of the color filter is beneficial to improve the disadvantage caused by the color shift phenomenon of the display.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 schematically illustrates a diagram of a display which the color filter 100 is applied to.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
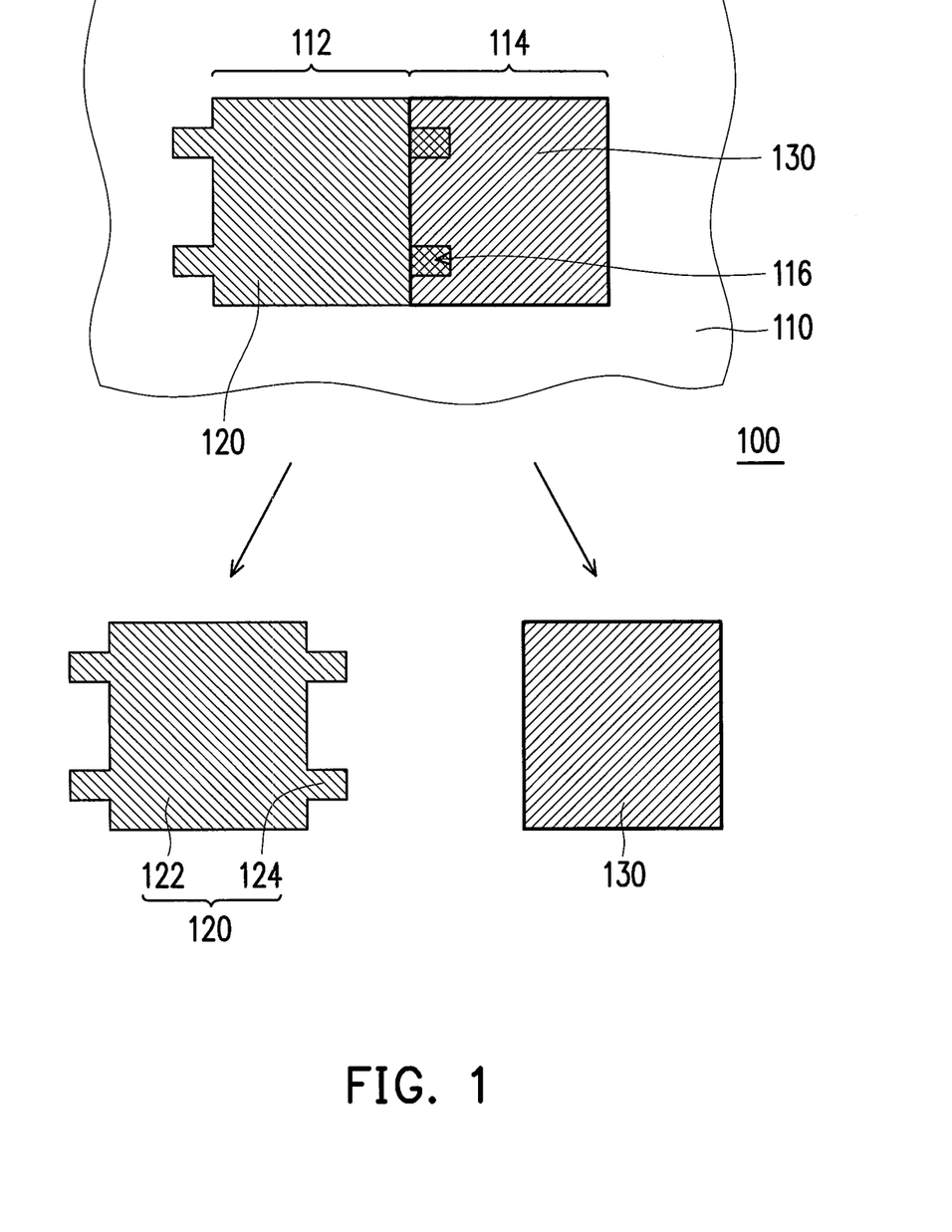
FIG. 1 schematically illustrates a partial top view of a color filter according to a first embodiment of the present invention.

FIG. 1 schematically illustrates a partial top view of a color filter according to a first embodiment of the present invention. Referring to FIG. 1, a color filter 100 includes a substrate 110, a first color filter pattern 120 and a second color filter 130. Please note that, this embodiment in which two kinds of color filter patterns are disposed on the substrate 110 is provided only for illustration purposes and is not construed as limiting the present invention. In another embodiment, three kinds or more kinds of color filter patterns can be disposed on the substrate 110, and the number of each kind can be multiple. Besides, these color filter patterns can be arranged in an array, in stripes, in triangles or may be in another arrangement. Therefore, in this embodiment, the disposition relationship and structure between two color filter patterns of the color filter 100 are merely provided for illustration, but the present invention is not limited thereto. In other words, not all color filter patterns on the color filter 100 are required to have the following structure design.

In this embodiment, the substrate 110 can have at least one first pixel region 112 and at least one second pixel region 114. The first pixel region 112 and the second pixel region 114 are adjacent to each other. In a specific design, the substrate 100 can have multiple first pixel regions 112 and multiple second pixel regions 114, and these pixel regions 112 and 114 are arranged in an array. That is, the number of each component herein is provided only for illustration purposes and is not construed as limiting the present invention.

Besides, the first color filter pattern 120 includes a first central pattern 122 and a plurality of first protruding patterns 124. The first central pattern is located within the first pixel region 112 and the first protruding patterns 124 are all connected to the first central pattern 122. In addition, the first protruding patterns 124 all protrude outwardly from the first central pattern 122 so that a portion of the first protruding patterns 124 protrude into the second pixel region 114.

The second color filter pattern 130 is substantially constituted by a central pattern and located within the second pixel region 114. Since a portion of the first protruding patterns 124 protrude into the second pixel region 114, the second color filter pattern 130 is partially overlapped with the first color filter pattern 120 to define an overlapped region 116. In this embodiment, the first color filter pattern 120 and the second color filter pattern 130 have different colors. The color of each of the first color filter patterns 120 and the second color filter patterns and 130 is selected from red, green, blue, yellow, purple, cyan, magenta, and so on. Therefore, the design that the second color filter pattern 130 is partially overlapped with the first color filter pattern 120 can serve as a transition region for different colors between the first pixel region 112 and the second pixel region 114. The design of the overlapped region 116 located between the first pixel region 112 and the second pixel region 114 is beneficial to improve the color shift phenomenon.

Figure 2:
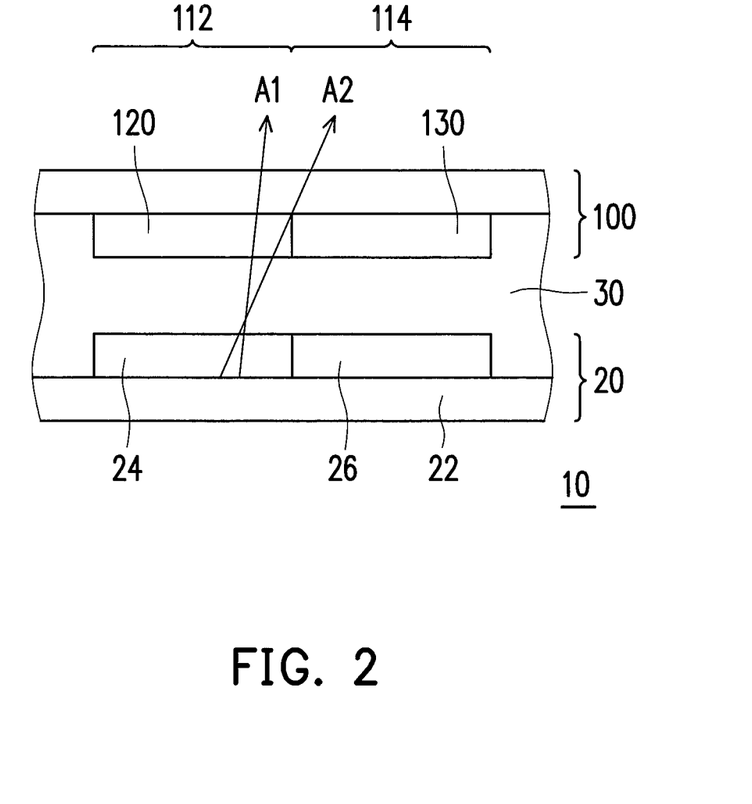

For example, FIG. 2 schematically illustrates a diagram of a display which the color filter 100 is applied to. Referring to FIG. 2, a display 10 includes an array substrate 20, the color filter 100 and a display medium 30, wherein the display medium 30 is interposed between the array substrate 20 and the color filter 100. Besides, the array substrate 20 includes another substrate 22 and a plurality of pixel structures 24 and 26 such that the array substrate 20 can be an active device array substrate. The first pixel region 112 corresponds to the pixel structure 24, and the second pixel region 114 corresponds to the pixel structure 26. Herein, the pixel structures 24 and 26 can be reflective pixel structures or transparent pixel structures. When the pixel structures 24 and 26 are reflective pixel structures, the display 10 can further include a backlight module located below the array substrate 20. In addition, the medium 30 can include a liquid crystal layer, an organic light emitting layer, an electrophoretic display medium layer, an electrowetting display dielectric layer, or another material layer which is driven by the pixel structures 24 and 26 so as to display a different transmittance.

When the image displayed by the pixel structure 24 is viewed from a viewing angle A1, the color represented by the first pixel region 112 is the color of the first color filter pattern 120 because most of first color filter pattern 120 is located within the first pixel region 112. However, when the image displayed by the pixel structure 24 is viewed from a viewing angle A2, the light may pass through the interface between the first color filter pattern 120 and the second color filter pattern 130 due to the increased viewing angle. At this time, the color shift phenomenon occurs because the first color filter pattern 120 has a color different from that of the second color filter pattern 130. That is, from the viewing angle A2, the color represented by the first pixel region 112 is different from the color of the first color filter pattern 120.

However, as shown in FIG. 1, the first color filter pattern 120 of this embodiment is protruding toward the second pixel region 114. When the image displayed by the pixel structure 24 is viewed from the viewing angle A2, a portion color of the image is still provided by the first color filter pattern 120. Therefore, the design of the color filter 100 is beneficial to mitigate the color shift phenomenon at a large viewing angle.

Further, a misalignment may occur when the color filter 100 and the array substrate 20 are assembled, and in such case, the pixel structure 24 may correspond to a portion of the second pixel region 114. However, the first color filter pattern 120 of this embodiment protrudes are toward the second pixel region 114, so that the said portion of the second pixel region 114 corresponding to the pixel structure 24 still has the first color filter pattern 120 disposed therein, and thus, the color shift phenomenon can be mitigated.

Figure 3:
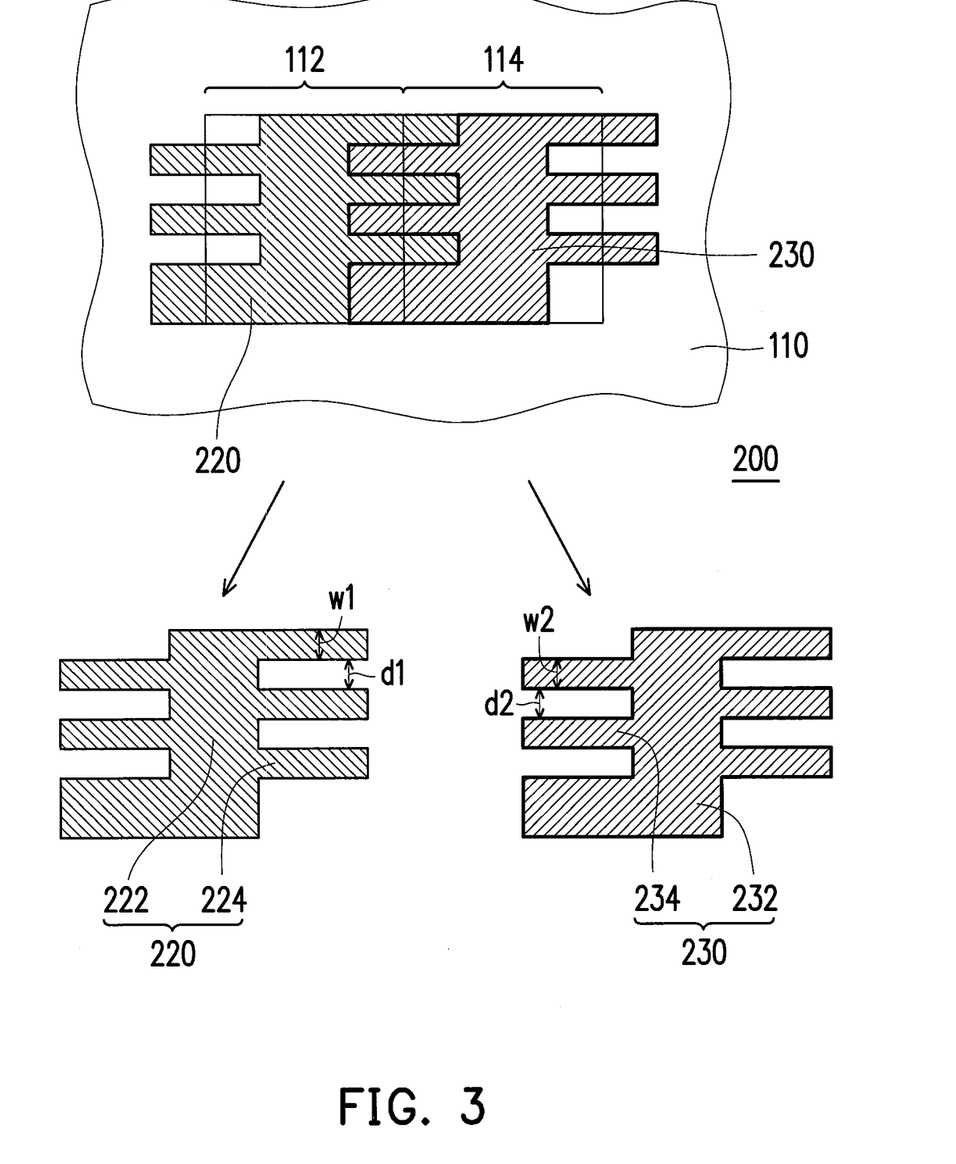
FIG. 3 schematically illustrates a partial top view of a color filter according to a second embodiment of the present invention.

The said embodiment in which the first color filter pattern protrudes toward the adjacent pixel region is provided only for illustration purposes, and is not construed as limiting the present invention. For example, FIG. 3 schematically illustrates a partial top view of a color filter according to a second embodiment of the present invention. Referring to FIG. 3, a color filter 200 includes a substrate 110, a first color filter pattern 220 and a second color filter pattern 230. Similar to the substrate 110 of the first embodiment, the substrate 110 of the second embodiment has a first pixel region 112 and a second pixel region 114. Herein, each of the first pixel region 112 and the second pixel region 114 is illustrated with a rectangle shape, but the present invention is not limited thereto. In another embodiment, each of the first pixel region 112 and the second pixel region 114 can have a non-rectangle shape such as rhombus, L-shape, Z-shape or V-shape etc. In addition, the pattern design of the first and second color filter patterns 220 and 230 in the second embodiment is different from that of the first and second color filter patterns 120 and 130 in the first embodiment.

Specifically, the first color filter 220 includes a first central pattern 222 and a plurality of first protruding patterns 224, wherein the first central pattern 222 is located within the first pixel region 112, and the first protruding patterns 224 are connected to the first central pattern 222 and protrude outwardly from the first pixel region 112. The second color filter pattern 230 includes a second central pattern 232 and a plurality of second protruding patterns 234, wherein the second central pattern 232 is locate within the second pixel region 114, and the second protruding patterns 234 are connected to the second central pattern 232 and protrude outwardly from the second pixel region 114.

In this embodiment, a portion of the first protruding patterns 224 protrude from the first pixel region 112 toward the second pixel region 114, so that the said portion of the first protruding patterns 224 are disposed in the second pixel region 114. Similarly, a portion of the second protruding patterns 234 protrude from the second pixel region 114 toward the first pixel region 112, so that the said portion of the second protruding patterns 234 are disposed in the first pixel region 112. In addition, the said portion of the first protruding patterns 224 and the said portion of the second protruding patterns 234 are arranged alternately. Herein, the area of the first color filter pattern 220 in the first pixel region 112 is greater than ½ of the area of the first pixel region 112. Besides, the area of the second color filter pattern 230 in the second pixel region 114 is greater than ½ of the area of the second pixel region 114. That is, the main area of the first pixel region 112 is occupied by the first color filter pattern 220, and the main area of the second pixel region 114 is occupied by the second color filter pattern 230. Therefore, the color represented by the first pixel region 112 is the color of the first color filter pattern 220, and the color represented by the second pixel region 114 is the color of the second color filter pattern 230.

The first protruding patterns 224 extend from the first pixel region 112 to the second pixel region 114, and the second protruding patterns 234 extend from the second pixel region 114 to the first pixel region 112. Therefore, the design of the first and second protruding patterns 224 and 234 can improve the color shift phenomenon (as illustrated in FIG. 2) when the color filter 200 is applied to a display. Besides, the width w1 of each first protruding pattern 224, the width w2 of each second protruding pattern 234, the distance d1 between two adjacent first protruding patterns 224, the distance d2 between two adjacent second protruding patterns 234 can be set upon the design requirements. Herein, the width w1 can be substantially equal to the distance d2 between two adjacent second protruding patterns 234, and the width w2 can be substantially equal to the distance d1 between two adjacent first protruding patterns 224. In such manner, the first protruding patterns 224 and the second protruding patterns 234 are closely adjacent to each other without overlapping with one another, but the present invention is not limited thereto.

Figure 4:
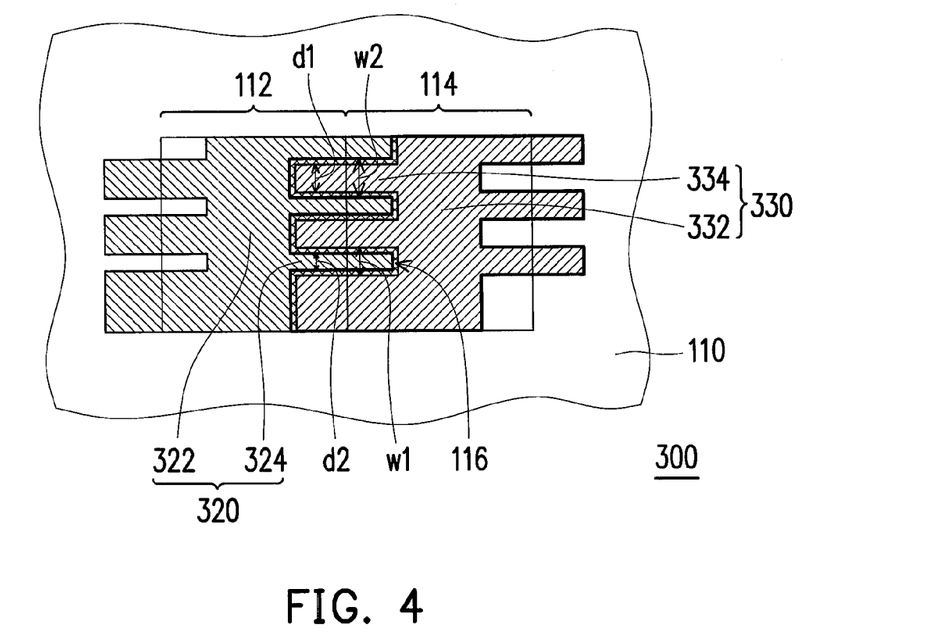
FIG. 4 schematically illustrates a partial top view of a color filter according to a third embodiment of the present invention.

FIG. 4 schematically illustrates a partial top view of a color filter according to a third embodiment of the present invention. Referring to FIG. 4, a color filter 300 includes a substrate 110 having a first pixel region 112 and a second pixel region 114, a first color filter pattern 320 and a second color filter pattern 330. The first color filter pattern 320 includes a first central pattern 322 and a plurality of first protruding patterns 324. The second color filter pattern 330 includes a second central pattern 332 and a plurality of second protruding patterns 334. Similar to the case of the previous embodiment, the first protruding patterns 324 are connected to the first central pattern 322 and extend outwardly from the first pixel region 112, so that a portion of the first protruding patterns 324 extend from the first pixel region 112 into the second pixel region 114. The second protruding patterns 324 are connected to the second central pattern 322 and protrude outwardly from the second pixel region 114, so that a portion of the second protruding patterns 334 extend from the second pixel region 114 into the first pixel region 112.

The difference between the third and second embodiments lies in the width and spacing design of the patterns. The width w1 of each first protruding pattern 324, the width w2 of each second protruding pattern 334, the distance d1 between two adjacent first protruding patterns 324, the distance d2 between two adjacent second protruding patterns 334 of the third embodiment are different from those of the second embodiment. Specifically, one of the first protruding patterns 324 is located between two adjacent second protruding patterns 334, and the width w1 of the one of the first protruding patterns 324 is greater than the distance d2 between the two adjacent second protruding patterns 334, so that the one of the first protruding patterns 324 is partially overlapped with the two adjacent second protruding patterns 334. At the same time, one of the second protruding patterns 334 is located between two adjacent first protruding patterns 324, and the width w2 of the one of the second protruding patterns 334 is greater than the distance d1 between the two adjacent first protruding patterns 324, so that the one of the second protruding patterns 334 is partially overlapped with the two adjacent first protruding patterns 324. Besides, the end portions of the first protruding patterns 324 can be selectively overlapped with the second central pattern 332, and the end portions of the second protruding patterns 334 can be selectively overlapped with the first central pattern 322. At this time, the overlapped region 116 defined by the overlap of the first color filter pattern 320 and the second color filter pattern 330 can have a curved pattern or a sawtooth pattern. Herein, the width and length of the overlapped region 116 are not particularly limited, and the profile of the overlapping area 116 is not required to be conformal to the boundary of the color filter pattern. Besides, the profile of the first color filter pattern 320 can be the same as or different from that of the second color filter pattern 330.

Figure 5:
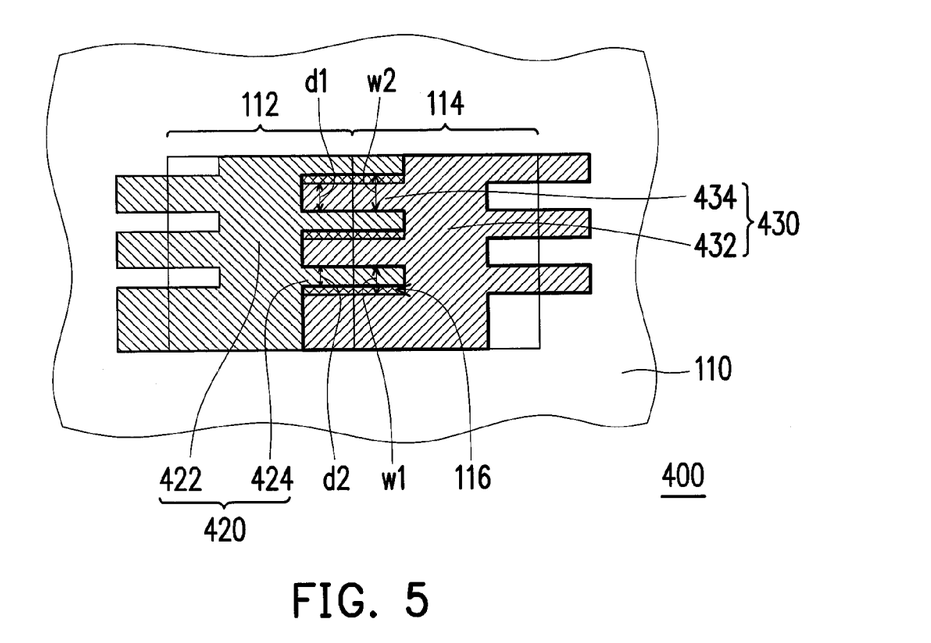
FIG. 5 schematically illustrates a partial top view of a color filter according to a fourth embodiment of the present invention.

In addition, FIG. 5 schematically illustrates a partial top view of a color filter according to a fourth embodiment of the present invention. Referring to FIG. 5, the color filter 400 is similar to the color filter 300, so that the same components are indicated with the same reference numerals in theses two embodiments. Specifically, in this embodiment, a first color filter pattern 420 includes a first central pattern 422 and a plurality of first protruding patterns 424 protruding outwardly from the first central pattern 422, and a second color filter pattern 430 includes a second central pattern 432 and a plurality of second protruding patterns 434 protruding outwardly from the second central pattern 432. Besides, the difference between the fourth and third embodiments lies in the width design of the protruding patterns.

In this embodiment, one of the first protruding patterns 424 is located between two adjacent second protruding patterns 434, and the width w1 of the one of the first protruding patterns 424 is greater than the distance d2 between the two adjacent second protruding patterns 434, so that the one of the first protruding patterns 424 is partially overlapped with one of the two adjacent second protruding patterns 434. One of the second protruding patterns 434 are located between two adjacent first protruding patterns 424, and the width w2 of the one of the second protruding patterns 434 is greater than the distance d1 between the two adjacent first protruding patterns 424, so that the one of the second protruding patterns 434 is partially overlapped with one of the two adjacent first protruding patterns 424. At this time, the overlapped region 116 defined by the overlap of the first color filter pattern 420 and the second color filter pattern 430 can be a discontinuous region.

Figure 6:
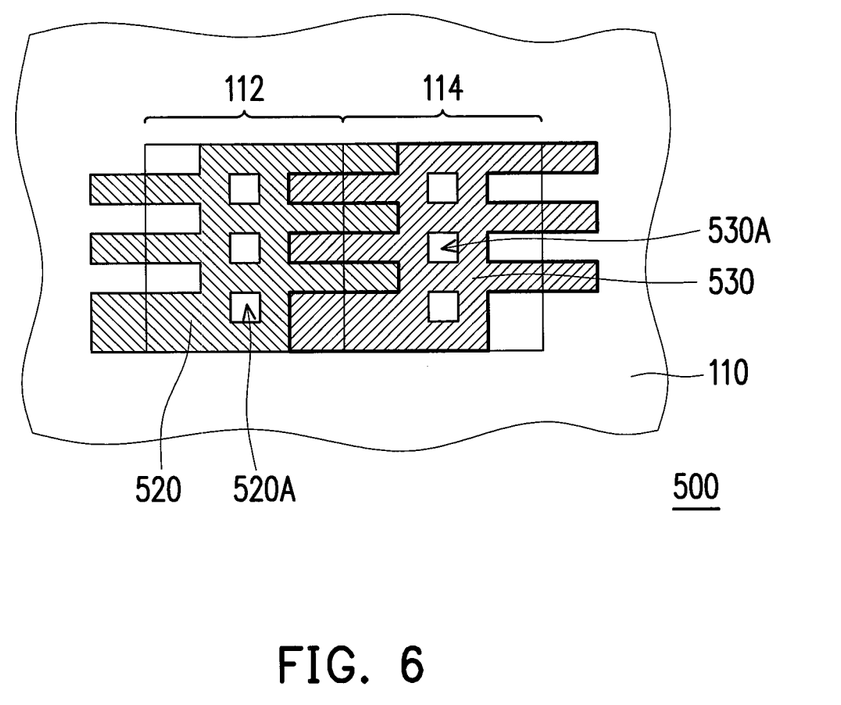
FIG. 6 schematically illustrates a partial top view of a color filter according to a fifth embodiment of the present invention.

In the said embodiments, each of the first color filter patterns 120, 220, 320 and 420 has a solid pattern, and each of the second color filter patterns 130, 230, 330 and 430 has a solid pattern. However, the present invention is not limited thereto. For example, FIG. 6 schematically illustrates a partial top view of a color filter according to a fifth embodiment of the present invention. Referring to FIG. 6, a color filter 500 includes a substrate 110, a first color filter pattern 520 and a second color filter pattern 530. Herein, the first color filter pattern 520 has a plurality of openings 520A, and the second color filter pattern 530 has a plurality of 530A, so as to increase the light transmission of the color filter 500. The color filter patterns 120, 130, 220, 230, 320, 330, 420 and 430 of the said embodiments can also selectively have openings.

Besides, although the color filter patterns 520 and 530 of this embodiment have the openings 520A and 530A, the area of the first color filter pattern 520 in the first pixel 112 is still greater than ½ of the area of the first pixel region 112, and the area of the second color filter pattern 530 in the second pixel 114 is still greater than ½ of the area of the second pixel region 114. Accordingly, when the color filter 500 is applied to a display, the color represented by the first pixel region 112 is still the color of the first color filter pattern 520, and the color represented by the second pixel region 114 is still the color of the second color filter pattern 530. Besides, both of the pixel regions 112 and 114 can display the desired color saturation.

In summary, in the color filter of each embodiment of the invention, two adjacent color filter patterns have respective protruding patterns arranged alternately. When the color filter of the invention is applied to a display, the color shift phenomenon can be improved as the display is viewed at a large viewing angle. Besides, when the color filter of the invention and an active device array substrate are assembled, even though a slight misalignment therebetween occurs, the color filter can still provide the desired optical filtering in the corresponding pixel region and therefore display the required color. Therefore, the color filter of each embodiment of the invention helps to enhance the display quality and increase the process window of the display.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A color filter, comprising:
    a substrate, having at least one first pixel region and at least one second pixel region adjacent to the first pixel region;
    a first color filter pattern, disposed on the substrate and comprising a first central pattern and a plurality of first protruding patterns, wherein the first central pattern is located within the first pixel region, the first protruding patterns are connected to the first central pattern and protrude outwardly from the first central pattern so that at least a portion of the first protruding patterns are located in the second pixel region, and a light passing through the portion of the first protruding patterns in the second region serves as a display light; and
    a second color filter pattern, disposed on the substrate and comprising a second central pattern located within the second pixel region.

2. The color filter of claim 1, wherein the second color filter pattern further comprises a plurality of second protruding patterns, the second protruding patterns are connected to the second central pattern and protrude outwardly from the second central pattern so that at least a portion of the second protruding patterns are located in the first pixel region, and the first protruding patterns and the second protruding patterns are arranged alternately.

3. The color filter of claim 2, wherein one of the first protruding patterns is located between two adjacent second protruding patterns, and a width of the one of the first protruding patterns is greater than a distance between the two adjacent second protruding patterns so that the one of the first protruding patterns is partially overlapped with at least one of the two adjacent second protruding patterns.

4. The color filter of claim 2, wherein one of the second protruding patterns is located between two adjacent first protruding patterns, and a width of the one of the second protruding patterns is greater than a distance between the two adjacent first protruding patterns so that the one of the second protruding patterns is partially overlapped with at least one of the two adjacent first protruding patterns.

5. The color filter of claim 1, wherein an area of the first color filter pattern in the first pixel region is greater than ½ of an area of the first pixel region.

6. The color filter of claim 1, wherein an area of the second color filter pattern in the second pixel region is greater than ½ of an area of the second pixel region.

7. The color filter of claim 1, wherein the first color filter pattern is partially overlapped with the second color filter pattern.

8. The color filter of claim 1, wherein the first color filter pattern and the second color filter pattern have a plurality of light-transmitting openings, respectively.

9. The color filter of claim 1, wherein the first color filter pattern and the second color filter pattern have different colors.

10. A display, comprising:
    the color filter of claim 1;
    an array substrate; and
    a display medium, disposed between the color filter and the array substrate.

11. The display of claim 10, wherein the array substrate has a plurality of pixel structures correspondingly disposed in the first pixel region and the second pixel region.

12. The display of claim 11, wherein the pixel structures are reflective pixel structures.

13. The display of claim 11, wherein the pixel structures are transparent pixel structures.

14. The display of claim 10, wherein the display medium comprises a liquid crystal layer, an organic light emitting layer, an electrophoretic display medium layer, an electrowetting display medium layer or a combination thereof.

15. The display of claim 10, wherein the array substrate is an active device array substrate.

16. The color filter of claim 1, wherein the first protruding patterns are not overlapped with the second color filter pattern.

\* \* \* \* \*